July 28, 1931.                H. S. YOUNG                 1,815,960
                    RAILWAY TRACK CIRCUIT APPARATUS
                         Filed June 15, 1931
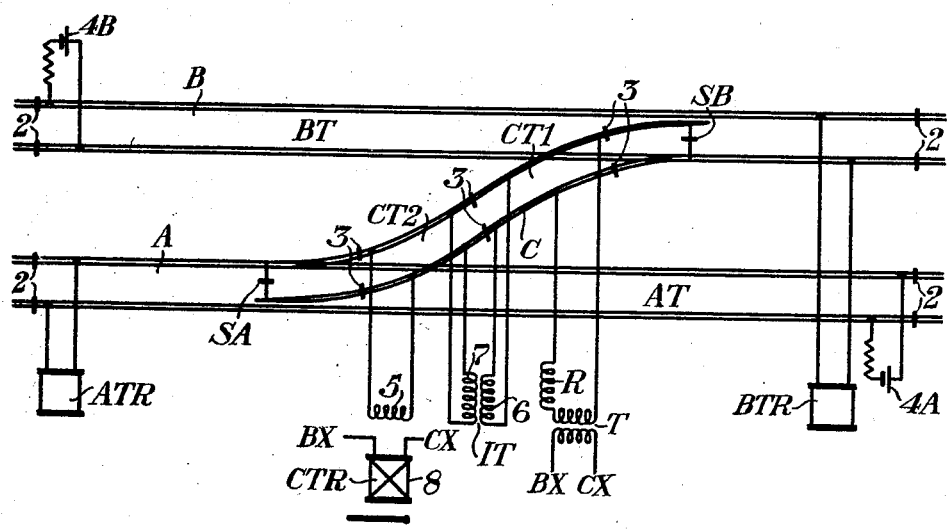
INVENTOR:
H. S. Young,
By  [signature]
His ATTORNEY.

Patented July 28, 1931

1,815,960

UNITED STATES PATENT OFFICE

HENRY S. YOUNG, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRACK CIRCUIT APPARATUS

Application filed June 15, 1931. Serial No. 544,486.

My invention relates to railway track circuit apparatus, and particularly to track circuit apparatus for crossovers between parallel tracks.

I will describe one form of apparatus embodying my invention, and will then point out the novel features thereof in the claim.

The accompanying drawing is a diagrammatic view showing one form of apparatus embodying my invention.

Referring to the drawing, the reference characters A and B designate two parallel railway tracks. Track A is provided with insulated joints 2 to form a track section AT, and track B is similarly provided with insulated joints 2 to form a track section BT. Section AT is provided with a track circuit comprising a battery 4A connected across the rails at one end of the section and a track relay ATR connected across the rails at the other end of the section. Track section BT is provided with a similar track circuit comprising a track battery 4B and a track relay BTR.

The sections AT and BT are connected by a crossover C, comprising the usual switches SA and SB. The rails of the crossover C are divided by insulated joints 3 to form two track sections CT1 and CT2. These sections are provided with a track circuit comprising a source of alternating current connected across the rails of section CT1, a track relay CTR having a winding 5 connected across the rails of section CT2, and a transformer 1T the primary 6 of which is connected across the rails of section CT1 and the secondary 7 of which is connected across the rails of section CT2. As here shown, the source of alternating current for this track circuit is a transformer T, the secondary of which is connected across the track rails and the primary of which is connected with a source of alternating current the terminals of which are designated BX and CX. The usual current-limiting impedance R is interposed between the secondary of transformer T and one rail of the crossover. The track relay CTR is of the two-winding type, the second winding 8 of which is connected with the terminals BX and CX of the same source of current as that which furnishes track circuit energy to the transformer T.

The insulated rail joints 3 at the junction of the two crossover track sections eliminate all metallic connection between the track circuits for tracks A and B, and the transformer 1T serves to transfer energy from section CT1 to section CT2 and at the same time maintains the insulation between track circuit AT and track circuit BT.

Furthermore, all dead sections, due to the usual insulated joints at the frogs, are eliminated by track circuit apparatus embodying my invention.

Although I have herein shown and described only one form of track circuit apparatus embodying my invention, it is understood that various changes and modifications may be made therein within the scope of the appended claim without departing from the spirit and scope of my invention.

Having thus described my invention, what I claim is:

In combination, two parallel railway tracks each provided with an insulated track section, a track circuit including a source of current and a track relay for each of said sections, a crossover connecting said track sections and divided by insulated joints to form two sections, and a track circuit for said crossover comprising a source of alternating current connected with the rails of one section and a track relay connected with the rails of the other section as well as a transformer the primary of which is connected with the rails of the first section and the secondary of which is connected with the rails of the second section.

In testimony whereof I affix my signature.

HENRY S. YOUNG.